(12) United States Patent
Guim Bernat et al.

(10) Patent No.: US 10,509,738 B2
(45) Date of Patent: Dec. 17, 2019

(54) REMOTE MEMORY OPERATIONS

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Narayan Ranganathan, Bangalore (IN); Pete D. Vogt, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 15/201,373

(22) Filed: Jul. 1, 2016

(65) Prior Publication Data

US 2018/0004687 A1  Jan. 4, 2018

(51) Int. Cl.
| | |
|---|---|
| *G06F 13/16* | (2006.01) |
| *G06F 13/40* | (2006.01) |
| *G06F 13/42* | (2006.01) |
| *H04L 12/803* | (2013.01) |
| *H04L 29/08* | (2006.01) |
| *G06F 15/173* | (2006.01) |
| *H04L 12/933* | (2013.01) |

(52) U.S. Cl.
CPC .......... *G06F 13/16* (2013.01); *G06F 13/4022* (2013.01); *G06F 13/4068* (2013.01); *G06F 13/42* (2013.01); *G06F 15/173* (2013.01); *H04L 47/125* (2013.01); *H04L 49/10* (2013.01); *H04L 67/10* (2013.01); *H04L 67/1095* (2013.01); *H04L 67/1097* (2013.01)

(58) Field of Classification Search
CPC .............................. H04L 67/1095; G06F 13/16
See application file for complete search history.

(56) References Cited

U.S. PATENT DOCUMENTS

| | | | |
|---|---|---|---|
| 7,293,021 B1 * | 11/2007 | Rafnsson | G06F 17/30867 |
| 7,782,869 B1 * | 8/2010 | Chitlur Srinivasa | |
| | | | G06F 9/5011 |
| | | | 370/230 |
| 9,846,540 B1 * | 12/2017 | Franklin | G06F 3/061 |
| 2005/0188105 A1 | 8/2005 | Reinhard et al. | |
| 2009/0015796 A1 | 1/2009 | Maeda et al. | |
| 2009/0157996 A1 | 6/2009 | Arimilli et al. | |
| 2009/0327962 A1 | 12/2009 | Betts-LaCroix et al. | |
| 2010/0268788 A1 * | 10/2010 | Arimilli | G06F 9/54 |
| | | | 709/213 |

(Continued)

OTHER PUBLICATIONS

International Search Report and Written Opinion for PCT Patent Application No. PCT/US2017/035719, dated Sep. 8, 2017, 13 pages.

*Primary Examiner* — Farley Abad
(74) *Attorney, Agent, or Firm* — Compass IP Law PC

(57) ABSTRACT

An extension of node architecture and proxy requests enables a node to expose memory computation capability to remote nodes. A remote node can request execution of an operation by a remote memory computation resource, and the remote memory computation resource can execute the request locally and return the results of the computation. The node includes processing resources, a fabric interface, and a memory subsystem including a memory computation resource. The local execution of the request by the memory computation resource can reduce latency and bandwidth concerns typical with remote requests.

23 Claims, 7 Drawing Sheets

(56) References Cited

U.S. PATENT DOCUMENTS

| | | | |
|---|---|---|---|
| 2010/0281166 A1* | 11/2010 | Buyya | G06F 9/5072 709/226 |
| 2011/0072204 A1 | 3/2011 | Chang et al. | |
| 2011/0113115 A1* | 5/2011 | Chang | G06F 15/7803 709/213 |
| 2011/0161975 A1 | 6/2011 | Alexander et al. | |
| 2012/0324567 A1* | 12/2012 | Couto | H04L 41/0853 726/12 |
| 2015/0178086 A1* | 6/2015 | Hughes | G06F 9/3806 711/125 |
| 2016/0085450 A1 | 3/2016 | Ahn et al. | |
| 2017/0034268 A1* | 2/2017 | Govind | H04L 67/1097 |
| 2017/0289242 A1 | 10/2017 | Keppel et al. | |

* cited by examiner

REMOTE MEMORY OPERATIONS

FIELD

The descriptions are generally related to network systems, and more particular descriptions are related to nodes in a network system with remote memory operation capability.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2016, Intel Corporation, All Rights Reserved.

BACKGROUND

The world of computing has increased the ability to create and use data. Correspondingly, more applications are created to generate and use more and more data. Data centers and server farms are now common, where many processing nodes operate in parallel across an interconnection fabric. Many operations in such environments involve the computation of many calculations that lend well to parallelism. Thus, a workload can be spread across many nodes in parallel for computation. Computations can be considered to need processing resources as well as data storage resources, especially for data-heavy operations. The sharing of processing resources enables remote nodes to perform computations. The sharing of memory resources enables remote nodes to store data and perform computations related to an overall operation.

However, there are inherent latency limitations in such an environment of memory sharing. Consider the scenario of a node (A) wanting to update a line in the local address space that is mapped to a remote node (B). (A) will first have to fetch and read the data from B, do some computation on the data, and store the data back to memory on node (B). In many cases, the operation to be performed on the memory of the remote node may be simple, for example, zeroing a range of memory in the remote node or performing a simple operation such as a data filter or search. The overhead of copying the data over the fabric, performing a relatively inexpensive compute operation, and moving the data back to the remote node is wasteful both in terms of additional latency incurred by the application to engage in the data transfers, as well as consumption of fabric bandwidth. Fabric bandwidth refers to the amount of data exchanged over the switching fabric interconnecting the nodes, and since it is a limited resource, excessive use can create a latency bottleneck.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a processing node in a network of nodes includes processing resources and memory resources, and the memory resources include memory computation resources. The memory computation resources enable the memory subsystems to perform certain operations without pushing the data back up to the processors. The node includes a fabric interconnection manager or fabric interface to couple to other nodes in the network over an interconnect fabric. The architecture of the node and the network are extended to enable proxy requests for remote memory computations. The node can expose memory computation capability to remote nodes. A remote node can request execution of an operation by a remote memory computation resource, and the remote memory computation resource can execute the request locally and return the results of the computation. The local execution of the request by the memory computation resource can reduce latency and bandwidth concerns typical with remote requests. The local computation does not require sending data back and forth across the fabric for execution of the computations, and does not dirty local caching by requiring execution of the computation by a local processor.

Such a solution is an improvement over existing solutions that push computation to a host fabric interface (HFI) using remote operations or "atomics". There are many operations where the need to traverse large volumes of data as done with atomics make it inefficient for the HFI to perform the operations. For example, operations involving massively data parallel operations lose the advantage of the data parallelism when pushed from the data in memory. Also, operations that involve zeroing data, or computation page level checksums, or others have advantage in remaining as close to the data as possible, and otherwise require the movement of large amounts of data over bandwidth-limited interconnects.

In traditional systems there is no mechanism that enables pushing a computation over the fabric to be performed by a memory hierarchy of a remote node, instead of exchanging the data over the fabric or performing the computation by the remote processing resources. As described herein, the memory computation capability can be exposed for remote request, and the memory subsystem of a node can receive a remote request and execute operations in response to the remote requests. The memory hierarchy can return a result of the operation without needing to exchange the data over the fabric or even require access to the data by the local processing resources or the HFI.

Figure 1:
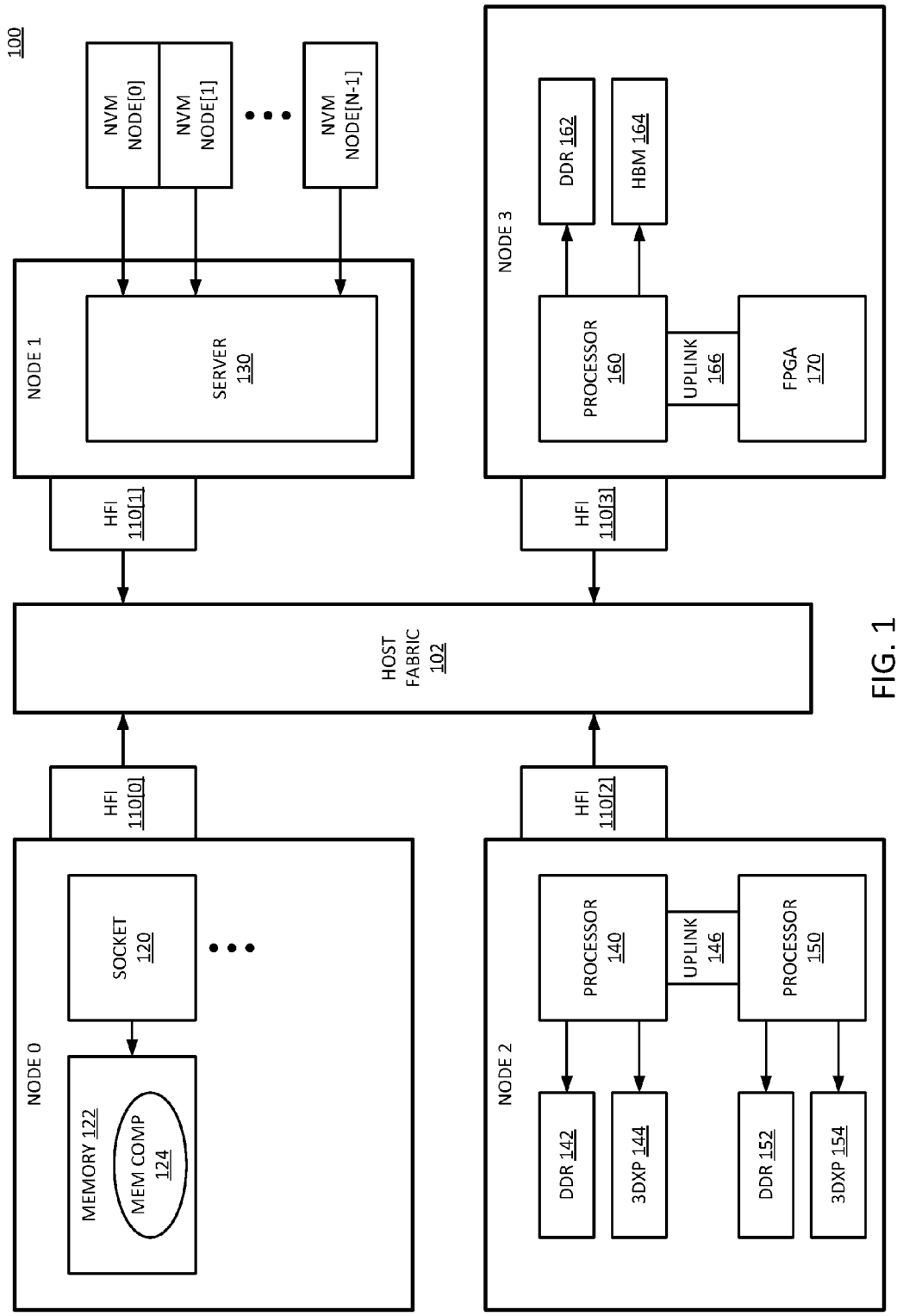
FIG. 1 is a block diagram of an embodiment of a network of nodes in which nodes with memory computation resources can expose the resources for use by remote nodes.

FIG. 1 is a block diagram of an embodiment of a network of nodes in which nodes with memory computation resources can expose the resources for use by remote nodes. System 100 includes multiple nodes coupled together via host fabric 102. System 100 illustrates four different nodes, Node 0, Node 1, Node 2, and Node 3. It will be understood that system 100 can include more nodes. Typically a server system or a data center will include dozens, or hundreds, or thousands of nodes. The nodes illustrated in system 100 represent non-limiting examples of types of nodes that can be included. In one embodiment, nodes of different type can be implemented in the same network. In one embodiment, the nodes in system 100 will be fairly uniform. Any type of system 100 where nodes include memory resources can implement embodiments of the remote memory operations.

Host fabric 102 represents a system of interconnections, which includes switches, routers, or other hardware devices, or a combination, to enable the flow of data from one node to another. Fabric 102 implements a host protocol such as Ethernet, TCP/IP (transport control protocol/internet protocol), or other protocol to transfer data from one device to another. The nodes of system 100 are interconnected to fabric 102 via a fabric interconnect mechanism, such as a host fabric interface (HFI). In general, HFIs 110 represent logic and hardware interconnections to couple nodes to fabric 102. In one embodiment, HFI 110 includes one or more management processes used to manage interconnection to the hardware components connecting the nodes to fabric 102. In one embodiment, such processes can include implementation of agents in one or more network protocol stacks executed at the node. Such protocol stacks can conceptually separate the network interface as including multiple layers, such as applications or agents operating in conjunction with or under a host operating system, one or more driver layers of software to drive specific hardware functions for the applications, one or more firmware layers of the hardware devices to implement the specific machine codes to implement the functions directed by the drivers, and hardware logic responsive to the machine codes to exchange (e.g., transmit or receive or both) data via registers, ports, hardware drivers (e.g., to generate the data signals). There are many known variations of such protocol stacks, which will not be discussed in detail here. HFI 110 represents such stacks or other hardware and software mechanisms or a combination for management of the exchange of commands/requests and data over fabric 102 with other devices.

Node 0 represents a node generically within system 100, and Nodes 1, 2, and 3 can be more specific representations of nodes in accordance with Node 0. Node 0 interconnects with fabric 102 via HFI 110[0]. In one embodiment, Node 0 includes socket 120, which generally represents a socket or other connector to enable the inclusion of a processor or CPU (central processing unit) in Node 0. Node 0 can be assumed to include a processor, and socket 120 represents the processor and other hardware logic to interface the processor with other components of Node 0, such as HFI 110[0] and memory 122. In one embodiment, Node 0 includes multiple sockets 120, each of which can include separate processor and memory resources. Node 0 includes one or more processors to execute operations at the node. The processors can include single core processors, multicore processors, application specific processors, or a combination.

Node 0 includes memory 122, which represent memory resources local to Node 0. Memory 122 includes memory computation (mem comp) 124, which represents one or more memory computation capabilities of memory 122. Memory computations 124 represent any type of operation on data that can be performed at memory 122 (e.g., at a memory module or with a memory controller or both) without sending the data up to the host processor for the operation and without sending the data over fabric 102 to a requesting processor for operation. For example, certain search functions, or zeroing of data, or the use of a storage server, or other functions can be performed at memory 122 without execution outside the memory subsystem.

As provided herein, system 100 enables Node 0, via HFI 110[0] to expose memory computation 124 over fabric 102 to the other nodes. Thus, the other nodes can make a remote request for memory operations by memory 122, on data stored at memory 122, or to be stored at memory 122. Thus, memory computation 124 provides a new type of resource accessible across the interconnect of fabric 102. In one embodiment, system 100 supports the exposure and discovery of such resources, and the use of such resources via protocol tunneling over fabric 102.

In one embodiment, memory 122 registers with HFI 110[0] to enable HFI 110[0] to indicate memory computation 124 to other nodes, such as through queries by their HFIs. In one embodiment, system 100 enables remote node requests for memory computations to a memory range of addresses, with the receiving memory to return the result of the operation to the remote requesting node. In one embodiment, system 100 enables remote node requests for memory computations to a range of memory addresses, with the receiving memory to return the result of the operation to the remote requesting node, and with the receiving memory storing the result of the operation to a given memory address. In one embodiment, HFI 110 (e.g., the HFIs for the different nodes) expose local memory computation resources, as well as performing discovery in system 100 to discover what type of memory computation operations are supported by other specific nodes in the architecture. In one embodiment, applications running in a scaled-out architecture in accordance with system 100 can dynamically discover what other nodes support with respect to memory computation enhancements.

With Node 0 representing a general example of a node, consider the more specific, but non-limiting examples of other nodes in system 100. Node 1 represents a storage server that can exist in system 100. Such a storage server can expose memory resources that enable the expansion of memory within system 100, such as through HFI 110[1] that interfaces Node 1 with fabric 102. For example, as illustrated, Node 1 includes server 130 to service N nonvolatile memory (NVM) nodes. Node 1 can be a representation of a pooled memory server. The NVM memory can be, for example, flash memory, 3DXP (three dimensional crosspoint), or other semiconductor-based nonvolatile memory. Each node can include memory resources available for mapping within system 100. In one embodiment, server 130 includes one or more additional memory computation resources for management of data stored at the memory nodes. Thus, a remote node processor core can map address space to memory of Node 1, and send requests for computation operations on the data at server 130, without having to send the data back to the requesting node.

Node 2 represents a system node that includes multiple processors, and different types of memory resources. Node 2 couples to fabric 102 via HFI 110[2], which can expose the memory computation capabilities of Node 2. While not specifically shown, it will be understood that Node 2 includes memory computation resources in the various memory subsystems illustrated. Node 2 includes processor 140, which connects to DDR (dual data rate) memory resources 142, and 3DXP 144. DDR memory resources 142 represent traditional DRAM (dynamic random access memory) resources in accordance with a DDR standard, such as DDR4 SDRAM devices (dual data rate version 4 synchronous dynamic random access memory devices). A socket for processor 140 can support connection to both DDR 142 and 3DXP 144. Each memory subsystem (e.g., 142 and 144) can include memory computation resources, which are not necessarily the same resources for each memory subsystem. HFI 110[2] can expose all memory computation resources available in Node 2, and direct traffic related to remote memory computation requests to the appropriate resource. While specifically shown as 3DXP 144 and 3DXP 154, either or both could be exchanged for other nonvolatile memory (NVM) resources.

In place of 3DXP, other memory technologies such as phase change memory (PCM) or other nonvolatile memory technologies could be used. Nonlimiting examples of nonvolatile memory may include any or a combination of: solid state memory (such as planar or 3D NAND flash memory or NOR flash memory), storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory. In some embodiments, 3D crosspoint memory may comprise a transistorless stackable cross point architecture in which memory cells sit at the intersection of wordlines and bitlines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

In one embodiment, Node 2 also includes processor 150, coupled to processor 140 via uplink 146. Uplink 146 represents one or more buses or other interconnections that enables parallel and semi-independent operation of processors 140 and 150. In one embodiment, processors 140 and 150 can operate either independently or together in parallel. Thus, they can execute portions of a common transaction, or handle separate transactions. In one embodiment, processor 150 is the same type as processor 140, and includes a same type of socket interconnection. Processor 150 or the socket, or both, are not necessarily the same as processor 140 and its socket. As illustrated, processor 150 couples to DDR memory resources 152 and 3DXP 154, which are memory resources local to processor 150. A request for Node 2 can be directed to separate memory resources, depending on where data is stored.

Node 3 represents a system node that includes a processor that connects to local memory resources, and one that does not. More specifically, Node 3 includes processor 160, which connects to local memory resources DDR 162 and 3DXP 164. In one embodiment, either or both memory resources include memory computation resources that HFI 110[3] will expose to system 100 over fabric 102. Like processors 140 and 150, processor 160 can be understood to connect to a socket or other connector. Node 3 includes FPGA (field programmable gate array) 170 or other gate array processor. FPGA 170 can provide processing functionality for Node 3 and for system 100, and not have local memory resources. FPGA 170 can couple to processor 160 via uplink 166.

Thus, system 100 provides a network architecture that can expose new types of memory resources accessible across the fabric interconnect of fabric 102. Such resources can include storage servers as with Node 1, and remote memory storage and computation as in Nodes 2 and 3. In one embodiment, nodes in system 100 can access storage server 130 of Node 1 via NVMe (nonvolatile memory express) over fabric 102 or other request. Thus, nodes can map parts of their visible memory address space to remote nodes or remote memory servers. Access to the remote-mapped memory resources can be accomplished through remote memory requests.

In one embodiment, system 100 supports new protocols to tunnel memory requests over fabric, referring to a tunneling of a memory request protocol over a protocol used by fabric 102. It will be understood that tunneling refers to the encapsulation of a protocol message or packet within one or more packets of a carrier protocol. For example, consider a memory request protocol, which can be referred to as MRP for the sake of this example, and consider that fabric 102 performs data exchange with Ethernet protocol. In such an example, "MRP over Ethernet" tunneling can include generating memory request packets in the "MRP" protocol, including headers and payload in accordance with whatever timing and parameters are defined for the protocol. An encapsulation engine (e.g., a process or agent executing at the node, such as at HFI 110) can generate one or more Ethernet packets, compliant with the definition of Ethernet packets, while the payload is the entire MRP packet. The Ethernet packet allows the transfer of the packet across fabric 102, and the receiving node can then detect that the Ethernet payload is actually an MRP packet. An MRP protocol engine can then decode the MRP packet to identify the packet payload for execution of a memory operation at the receiving node, or can identify results received from a node that executed the memory computation.

Consider an example of Node 3 accessing memory storage of Node 2. More specifically, consider that processor 160 includes a portion of mapped memory address space to DDR 152 and a portion mapped to 3DXP 154 of Node 2. In a traditional system, Node 3 can access the data in DDR 152 and 3DXP 154, but to do so must request the entire data be retrieved over fabric 102 from Node 2, perform computations locally at Node 3 on the data, and then send the data back to Node 2 over fabric 102. Such an approach incurs significant latency, as well as consuming fabric bandwidth. In another conventional approach, processor 160 can request the execution of operations at Node 2 on the memory. Such an approach can save significant data transfer delay and fabric bandwidth. However, local caching resources of processor 150 and possibly processor 140 will be polluted by executing the request. The processing resources of Node 2 will have to interrupt their executing processes and replace their cached data, which will cause latency and inefficiency overall in system 100.

In contrast to the conventional approaches, processor 160 of Node 3 can generate one or more remote memory computation requests. While not every data computation will necessarily be supported by remote memory computations, for memory computations available from the memory resources, processor 160 can generate the requests and send them to the specific memory resources (DDR 152 or 3DXP 154). The memory resources can perform the computations locally at the memory and return the results to processor 160.

Figure 2B:
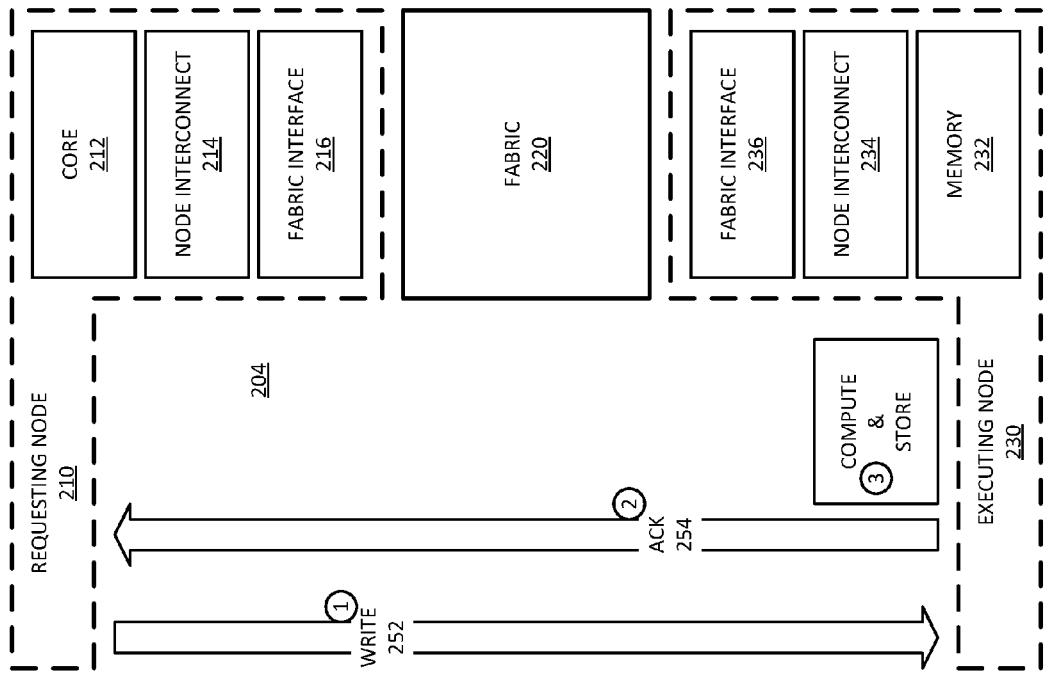
FIG. 2B is a block diagram of an embodiment of a remote write computation to a remote node with a memory computation resource.
Figure 2A:
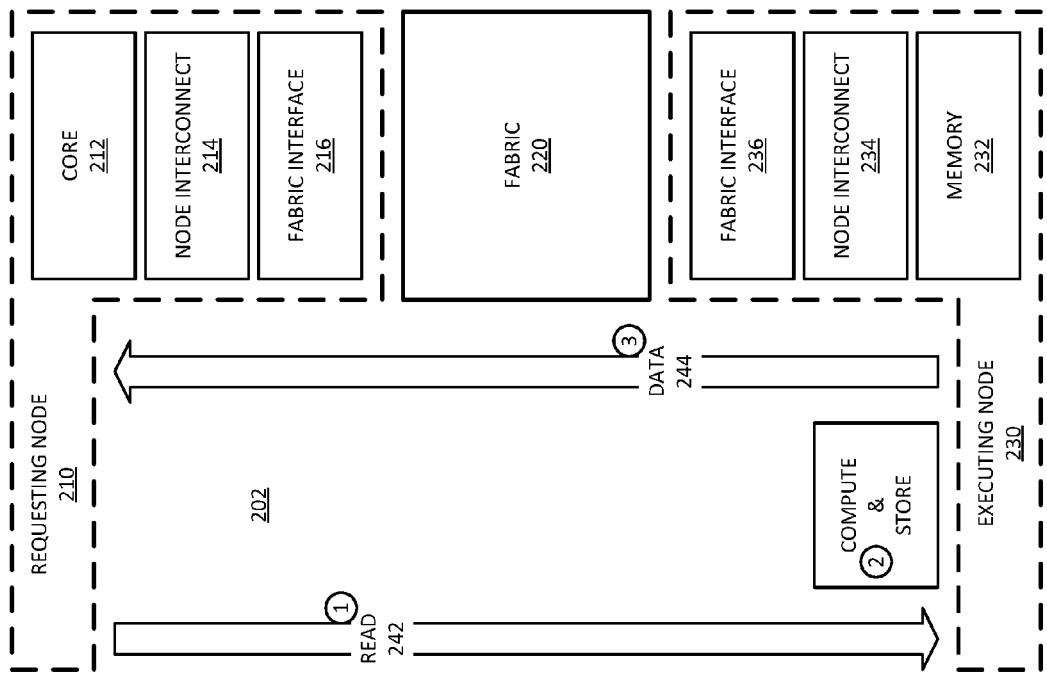
FIG. 2A is a block diagram of an embodiment of a remote read computation to a remote node with a memory computation resource.

FIG. 2A is a block diagram of an embodiment of a remote read computation to a remote node with a memory computation resource. System 202 provides one example of a system in accordance with an embodiment of system 100. More specifically, system 202 represents a read operation to be executed by a memory computation resource.

Requesting node 210 represents a node of a network in accordance with any embodiment described herein. Executing node 230 represents a node of a network that has a memory subsystem with memory computation resources in accordance with any embodiment described herein. In one embodiment, executing node 230 includes a storage server. In one embodiment, executing node 230 includes a processing node of the network, including memory with memory computation capability.

System 202 illustrates one embodiment of a read operation flow. Requesting node 210 generates a remote memory computation read request 242, which is sends to executing node 230. It will be understood that core 212 of requesting node 210 generates the request. Core 212 includes the processor resources of node 210. Core 212 generates read request 242 as part of execution of one or more operations at node 210. In one embodiment, core 212 sends read request 242 to node interconnect 214. Node interconnect 214 represents hardware interfaces and control logic within node 210 to interconnect core 212 to fabric interface 216 (such as a host fabric interface).

Fabric interface 216 represents a fabric interface in accordance with any embodiment described herein. Fabric interface 216 couples node 210 to fabric 220, and discovers the memory computation resources of node 230. In one embodiment, fabric interface 216 prepares read request 242 to be sent over a protocol of fabric 220. Fabric 220 represents a fabric in accordance with any embodiment described herein. In one embodiment, fabric 220 is extended relative to traditional fabric interconnects, with the ability to tunnel remote computation flows with requests and returned results. In one embodiment, the fabric is extended at the L4 layer to enable tunneling of remote memory computation operation exchanges.

Node 230 receives read request 242 over fabric 220 at fabric interface 236. Fabric interface 236 can be a fabric interface in accordance with any embodiment described herein. In one embodiment, fabric interface 216 provides read request 242 tunneled over fabric 220, and host fabric interface 236 extracts the read request. Fabric interface 236 provides read request 242 to node interconnect 234, which can be a node interconnect as previously described.

Node interconnect 234 provides read request 242 to memory 232, which performs the requested computation. In one embodiment, memory 232 computes and stores the result from data stored in memory 232. Memory 232 sends the result as data 244 to request node 210. The path of data 244 will be the opposite of read request 242.

FIG. 2B is a block diagram of an embodiment of a remote write computation to a remote node with a memory computation resource. System 204 provides one example of a system in accordance with an embodiment of system 100. More specifically, system 204 represents a write operation to be executed by a memory computation resource. System 204 represents an embodiment of a write by requesting node 210 to executing node 230 over fabric 220. Node 210 and its components are described above with respect to FIG. 2A, as the components of node 230.

Node 210 generates and sends write request 252 over fabric 220. In one embodiment, in response to write request 252, when node 230 is ready to perform the computation to execute the write request, memory 232 generates and sends acknowledgement (ACK) 254 to node 210. In one embodiment, memory 232 acknowledges the write request before completion of the computation, such as at start of computation. In one embodiment, memory 232 then computes and stores the data associated with write request 252.

Figure 3A:
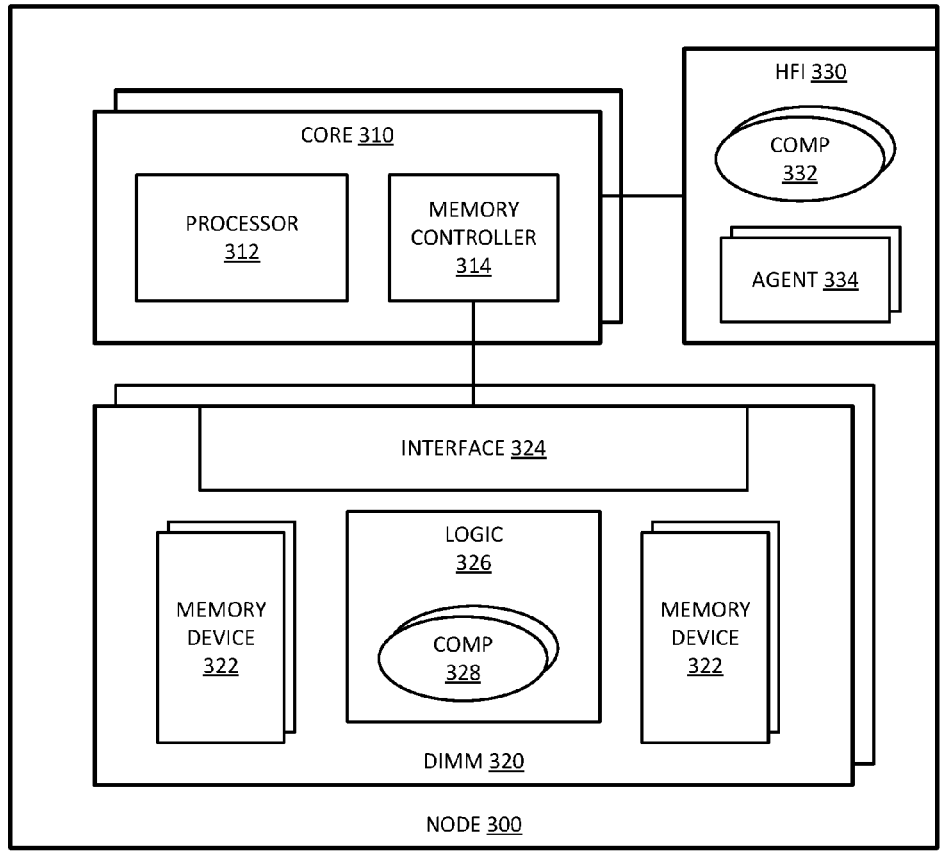
FIG. 3A is a block diagram of an embodiment of a node of a network of nodes with a memory computation resource made accessible for execution by a remote node.

FIG. 3A is a block diagram of an embodiment of a node of a network of nodes with a memory computation resource made accessible for execution by a remote node. Node 300 represents a system node with one or more memory computation resources 332. Node 300 includes core 310, which represents a processing core for node 300. In one embodiment, node 300 includes DIMM (dual inline memory module) 320 or other memory module. In one embodiment, node 300 includes HFI 330 or other fabric interface.

Core 310 includes processor 312, which can be or include any one or more processor devices. Processor 312 can include a single core or multicore processor, or other processor, or a combination. Core 310 includes memory controller 314 to manage access to memory resources in node 300. More specifically, memory controller 314 manages read and write access and other accesses to DIMM 320. In one embodiment, memory controller 314 is a standalone component separate from processor 312. In one embodiment, memory controller 314 is integrated with processor 312. In one embodiment, processor 312 includes interface circuitry managed by embedded memory controller code. Core 310 can include multiple memory controllers 314 to separately manage access to one or more memory channels. While not specifically shown, core 310 includes a host operating system executed by processor 312, and one or more applications or other processes or services to provide functionality in node 300.

DIMM 320 includes memory devices 322. Node 300 can include multiple DIMMs 320. DIMM 320 includes interface 324, which provides one or more buses to interface with memory devices 322 on the DIMM. Interface 324 can include contacts, signal lines, transceivers, or other hardware and associated logic to manage the interface. DIMM 320 includes logic 326, which represents logic resources on the memory module. In one embodiment, logic 326 can represents a buffer or register for memory on DIMM 320. In one embodiment, logic 326 includes processing resources separate from processor 312 of core 310 for performing memory computations. In one embodiment, memory controller 314 includes processing resources separate from processor 312 for purposes of performing memory computations. Memory computations (comp) 328 represent the memory computation resources of node 300. Memory computation resources 328 provide the ability of memory in node 300 to perform computations for local memory requests, and to execute operations for remote memory operation requests.

HFI 330 exposes the memory computation resources of node 300. Memory computation resources 332 represent memory computation resources 328, and any other memory computation resources of other DIMMs in node 300. In one embodiment, HFI 330 exposes a new interface to core 130 and other cores to invoke memory operations on a remote node. In one embodiment, HFI 300 includes an extension over traditional interface, to enable the HFI to process requests coming from remote nodes with regards to memory operations indicated by memory computations 332. Computations 332 can include read, write, or discovery operations. In one embodiment, HFI 330 is extended relative to traditional fabric interfaces to store the supported memory computation capabilities for memory controller 314 and other memory controllers in node 300.

In one embodiment, memory controller 314 is extended relative to traditional memory controllers to support memory operations coming from HFI 330. In one embodiment, memory controller 314 is extended to register to HFI 330 to indicate what memory computation operations 328 are supported by the memory. In one embodiment, memory controller 314 registers with HFI 330 at reset time.

The traditional application of memory computations has been limited to local use. Proposals exist for HFI to support remote atomic operations with memory computations. Remote atomic operations traditionally load memory data into an HFI cache, allow the HFI to perform one or more operations, and store the result back to the memory. However, remote atomic operations do not consider the semantics to expose memory computation interfaces over the fabric. Traditional atomic operations pollute the cache memory in the remote HFI, if used. Traditional atomic operations also add unnecessary traffic in the on die interconnect in the remote node, which implies more power and more pressure to the interconnect. Such operation can thus result in degradation of the system performance. Traditional atomic operations also add latency to the requests, to bring the data from memory, perform the operation, and store it back to memory (or in the cache if any). Such operations use double the memory bandwidth to effectively get the required useful bandwidth, due to reading the data and then writing the data back.

In one embodiment, HFI 330 includes one or more agents 334, which represent processes or applications at the HFI to provide interconnect management to the fabric. Examples of agents can include caching agents, home agents (e.g., HA), unified path interconnect (UPI) agents, or others. Caching agents represent coherency agents within a node that process memory requests from the cores within the same node. Thus, requests from core 310 can be processed by a CHA in HFI 330. Home agents represent node clusters that are responsible for processing memory requests from the caching agents, and act as a Home for part of the memory address space. In one embodiment, one die can have multiple Homes having a distributed address space mapping. Depending on the address space targeted by received requests, the HA may send the request to the same node's local memory, or send to a UPI agent to route the request to processors outside node 300 but within the same coherent domain, or send the request through the HFI to remote processors outside the coherent domain. A coherent domain refers to a collection of resources coupled to a common management resource. For example, all processors connected through a memory coherent link can belong to the same coherent domain.

In one embodiment, a system in which node 300 is included can include one or more coherent domains. In one embodiment, the system is composed of all coherent domains connected through fabric interconnect. For example HPC or data centers can be composed by N clusters or servers that can communicate with each other using the fabric. Using the fabric, each coherent domain can expose some address regions to the other coherent domains. However, accesses between different coherent domains are not coherent. In such an example implementation, the fabric interconnect allows mapping address of memory ranges between different coherent domains. Such mapping of memory address space can facilitate the sharing of memory resources among remote nodes.

HFI 330 includes logic to process requests coming from local cores 310 targeting remote memories. Such logic enables node 300 to make a remote request to remote memory resources over a fabric. In one embodiment, a fabric that node 300 connects to enables messaging to convey remote memory computation requests and discovery requests between nodes. In one embodiment, such messaging can be implemented on top of an L4 layer to prevent the need for changes at lower layers.

In one embodiment, memory controller 314 registers with HFI 330 to indicate what memory operations are supported with memory computations 328. In one embodiment, memory computations 328 are part of a defined class of capabilities, with separate capabilities identified by a unique identifier. Thus, for example, memory controller 314 can register, and HFI 330 can expose one or more UUIDs (universal unique identifiers), and based on the UUIDs, other remote nodes will know what memory computations 328 (and 332 to the extent memory computations 332 indicate more capabilities than memory computations 328) are available in node 300. In one embodiment, HFI 330 can include a definition of UUIDs to be able to identify remote memory operation capabilities from remote nodes or node peers, as well as identifying its local memory computations 332. In one embodiment, each UUID has a unique definition in terms of what the operation does, what operands and parameters are required and accepted.

In operation of node 300, it will be understood that processor 312 executes a host operating system and one or more applications or other processes. The execution of such software components generates memory access requests, and requests to process data. In one embodiment, system software within node 300 is extended to expose mechanisms such as software interfaces, service calls, or function calls, or other mechanism, to enable an application or process to discover the memory computation capabilities of peer nodes. The software extension can include, for example, the use of libraries that expose discovering mechanisms exposed by HFI 330, to enable generation of calls or requests for HFI to perform discovery of memory computation capabilities within the network.

Figure 3B:
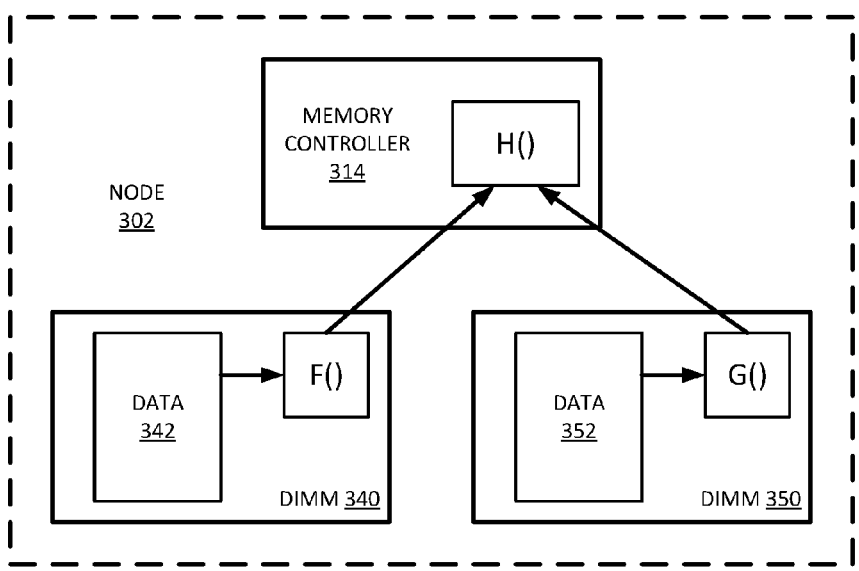
FIG. 3B is a block diagram of an embodiment of a node of a network of nodes with a memory controller that registers memory computation functionality based on multiple memory computation resources within the node.

FIG. 3B is a block diagram of an embodiment of a node of a network of nodes with a memory controller that registers memory computation functionality based on multiple memory computation resources within the node. Node 302 provides an example of a "capability" perspective of node 300 of FIG. 3A.

More specifically, memory controller 314 couples to DIMMs 340 and 350. At least one of DIMM 340 or DIMM 350 can be an example of local DIMM 320 of FIG. 3A. In one embodiment, at least one of DIMM 340 or DIMM 350 can be a remote memory resource to which memory controller 314 maps part of its address space. In one embodiment, DIMM 340 is a remote memory resource on one remote node, and DIMM 350 is a remote memory resource on a different remote node.

Consider a task of performing compute operation H( ) on large volumes of data. Assume that H( ) is decomposable into functions F( ) and G( ). In one embodiment, F( ) and G( ) are the same operation, and would be performed on separate datasets. Memory controller 314 can generate requests for data. For memory resources local to the node of memory controller 314, the requests can be sent to the local memory resources for execution. For remote memory resources, node 300 can send remote requests to other nodes over a fabric. While generally referred to herein as remote memory requests, such remote requests could be referred to as proxy requests. The HFI can act as the proxy. In response to the memory operation requests, DIMM 340 can execute function F( ) on data 342, and DIMM 350 can execute function G( ) on data 352.

In one embodiment, both DIMM 340 and DIMM 350 are memory resources at remote nodes, and F( ) and G( ) are equivalent functions. Function H( ) at memory controller 314 uses the values generated by F( ) and G( ) to complete its operation. Examples of operations where there is a need to traverse large volumes of data the task of searching a dataset for a given element (which is massively data parallel), computing page level checksums, zeroing out pages, or other tasks. For operations that are massively data parallel, it will understood that such operations can take better advantage of data parallelism when pushed out to memory computation (pushed out to the data instead of executed in the core or the HFI). It will be understood that the computation of page level checksums can be useful for persistent memory, to ensure data on a remote node is indeed what the application expects it to be, by comparing it with an existing pre-computed set of checksums.

As a simplified illustration, consider the following database table

| EMPL ID | LAST NAME | AGE | ZIPCODE |
| --- | --- | --- | --- |
| 1 | SMITH | 58 | 85249 |
| 2 | WAYNE | 23 | 85241 |
| 3 | HAYES | 45 | 47906 |
| 4 | LEE | 76 | 11249 |
| . . . | . . . | . . . | . . . |
| 100000 | ZACH | 45 | 85251 |

A query to a specific table may be to return all employees with zipcode "85251", in which case the result may be just a set of EMPL IDs. Such a result could be returned in a bit vector. As another example, a query to the table could be to return all employees under the age of 30. Countless other examples are possible. In such cases, the computation or operation to be performed is massively data parallel. Massively data parallel operations can be performed on the data in parallel, without the need to serialize or move into the processor caches for operation. Additionally, in such cases the results to be sent back are often yes/no (for example: is XYZ present in the dataset), or smaller sets of IDs or bit vectors (as with the examples above). The application of remote or proxied memory requests as provided herein can enable efficient computation of such operations, pushing the computations over the fabric to be performed by the memory hierarchy of remote nodes.

Figure 4:
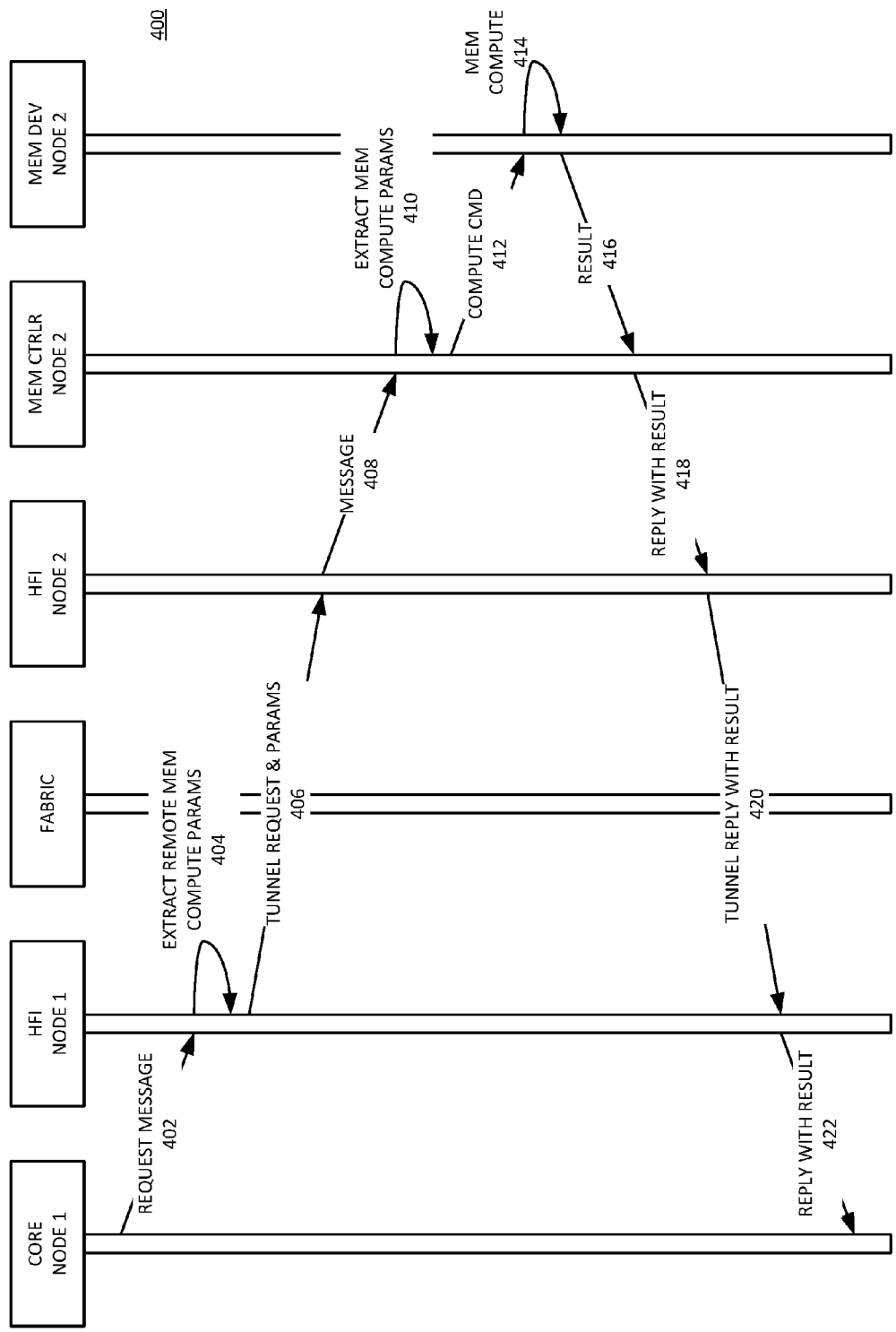
FIG. 4 is a flow diagram of an embodiment of a process for execution of a remote memory computation.

FIG. 4 is a flow diagram of an embodiment of a process for execution of a remote memory computation. Process 400 represents a flow for a remote memory computation request. Such a flow for remote memory computation can be in accordance with an embodiment of remote memory computation as described above for system 100, system 202, system 204, or node 300. For example, process 400 can represent a read or write flow. For the flow of process 400, a core at Node 1 generates a request to be executed by memory of Node 2.

The core of Node 1 generates a request for data. In one embodiment, an application executing at the core requires data and generates a message with the memory address where the parameters for the remote memory operation are stored. The parameters can include the memory operation to perform and parameters defining the operands of the memory operation.

Parameters that define the operands of the memory operation can include a parameter to indicate if the result of the memory computation is expected or not. If not, no data will be returned to the requestor. In one embodiment, if a result is expected, the application can provide a memory address parameter indicating a memory address in the remote node in which to store the result. Parameters that define the operands of the memory operation can include a memory range or ranges where the operation needs to be performed. Parameters that define the operands of the memory operation can include a parameter indicating whether or not the remote memory operation needs to keep coherency with respect to remote nodes. Parameters that define the operands of the memory operation can include a target node hosting the memory device.

Thus, the compute element sends a request message to the HFI within Node 1, 402. In one embodiment, the core issues the request message in the form of a command sent across an on-die interconnect from the core to the HFI. In one embodiment, the HFI extracts remote memory computation parameters associated with executing the request by a remote node, 404. Thus, the HFI can prepare a remote request and the parameters needed to execute the request (e.g., memory address). The HFI sends the request as a message over the fabric. In one embodiment, the HFI tunnels the request and the associated parameters over the fabric to the target node, 406.

In one embodiment, once the HFI of Node 2 receives the request, it requests ownership of a set of memory lines via an agent (e.g., a caching agent). The HFI can request the ownership without requiring the data itself, which can allow the memory to perform the memory operations without sending the data to the HFI. In one embodiment, the HFI requests ownership to store the parameters of the request (e.g., memory address information (mem_refs) and operations (ops)). The HFI sends the message to the memory controller of Node 2, 408. In one embodiment, the HFI issues a command to the memory controller hosting the memory references provided as a parameter. It will be understood that the HFI can include a mechanism (e.g., a mapping data structure) to indicate what agent in the node should receive the request. For example, the HFI can include one or more system address decoders.

In one embodiment, the HFI normally requests ownership of the memory address space, but does not request ownership of the memory address space if coherency does not need to be guaranteed when performing the memory computation operation. In one embodiment, where coherency should be guaranteed, the HFI can hold ownership of the lines indicated by the memory address space until the operation is finished.

In one embodiment, the memory controller of Node 2 extracts the memory computation parameters indicated in the request, 410. Such parameters may be pointed to by a memory descriptor. In one embodiment, reads generated to the descriptor will hit the cache of the HFI, if the HFI has previously acquired ownership of the lines. The memory controller provides the computation command to the memory device, 412. Such a command can include the parameters and any accompanying memory references.

The memory device of Node 2 performs the memory computation requested by Node 1, 414. In one embodiment, the request indicates a response is required, the memory device generates the required data result. In one embodiment, the request indicates a response is not required, in which case the memory device can simply generate an acknowledgement to send back to Node 1. For the following description, the data result and an acknowledgement can be considered "the result" of the memory computation.

The memory device of Node 2 provides the result to the memory controller, 416. The memory controller can in turn provide a reply with the result to the HFI of Node 2, 418. In one embodiment, the HFI of Node 2 generates a reply with the result for Node 1, and tunnels the reply with the result to the HFI of Node 1, 420. The HFI can provide the reply with the result to the core of Node 1, which was the requestor of the memory computation, 422.

In one embodiment, certain parameters and an operation are assumed to apply when they are received at the remote node. However, if the parameters that the memory device expect are different than what is received in the request, in one embodiment, the memory controller extends the operation to convey the different parameters. For example, if the memory device expects two operations and only one is received, in one embodiment, the memory controller can convey the extra parameters. In one embodiment, if the target HFI (i.e., the "remote" HFI) does not support the request or if the memory references do not match to a memory controller implementing the memory computation, in one embodiment the receiving HFI generates and returns a NACK (a negative acknowledgement).

Figure 5:
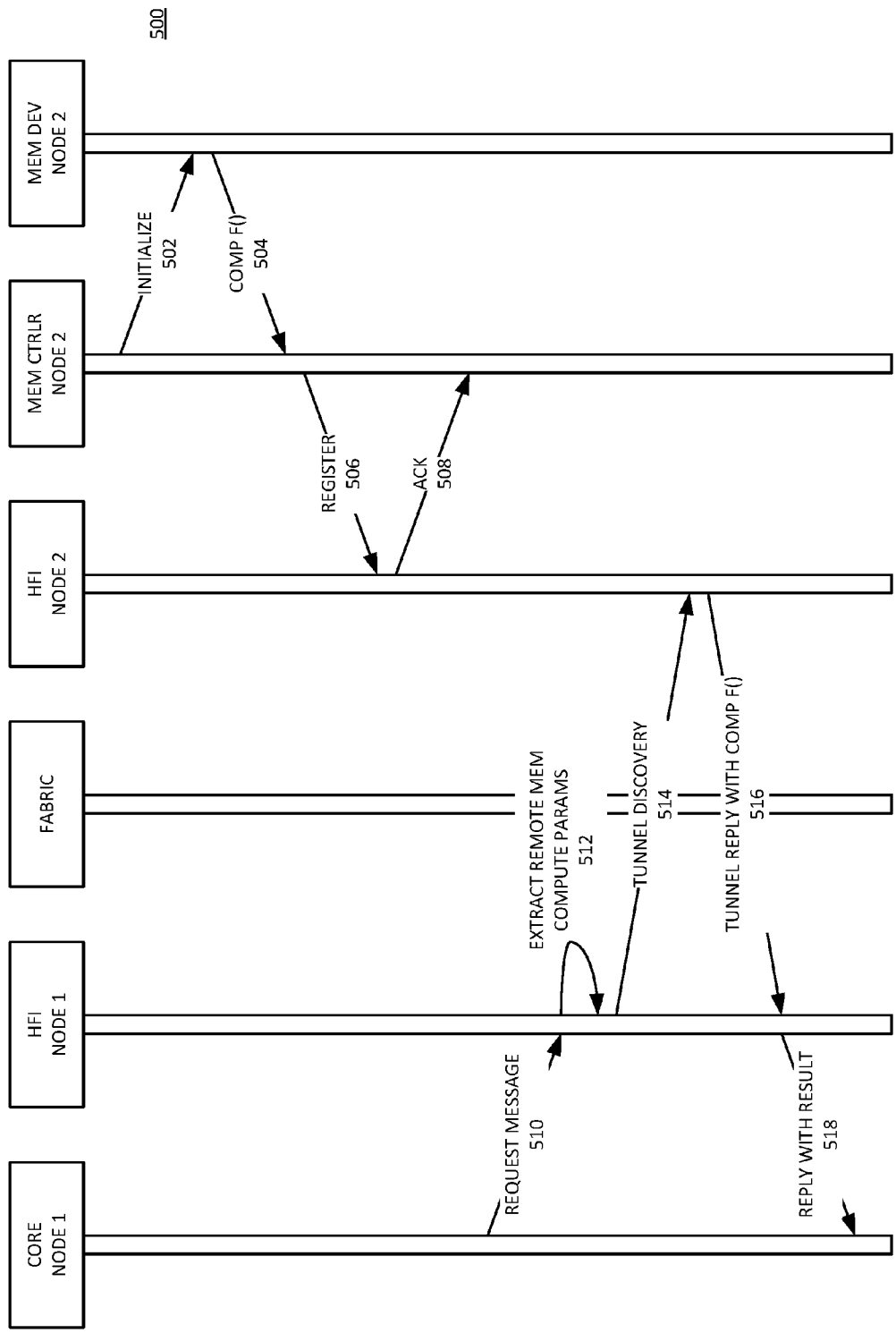
FIG. 5 is a flow diagram of an embodiment of a process for registering and discovery of remote memory computation resources.

FIG. 5 is a flow diagram of an embodiment of a process for registering and discovery of remote memory computation resources. Process 500 represents a flow for a remote memory computation request. Such a flow for remote memory computation can be in accordance with an embodiment of remote memory computation discovery as described above for system 100, system 202, system 204, or node 300. In one embodiment, the discovery flow is standardized. In one embodiment, the discovery flow is specific to a system implementation. The discovery flow enables a network node with memory computation resources to enumerate its capabilities for accepting and executing remote requests. Not all network nodes will necessarily have memory computation capability to expose. Not all network nodes that expose memory computation capabilities will necessarily have the same capabilities to expose. For purposes of the example in system 500, Node 1 is the requesting node and Node 2 is the receiving or executing node.

A memory subsystem of Node 2 is initialized, such as in connection with a reset or other condition. In one embodiment, the memory controller of Node 2 performs an initialization routine with the memory resources of Node 2, 502. In one embodiment, as part of the initialization routine, the memory devices indicate, or the memory controller otherwise discovers, one or more memory computation functions F( ) that the memory can perform, 504. Based on the capabilities of the memory resources, the memory controller can indicate what its capabilities are. In one embodiment, the memory controller registers with the HFI of Node 2, 506. In one embodiment, the HFI of Node 2 can register each memory controller on Node 2 to determine what memory computation functionalities each of the memory controllers expose. In one embodiment, registering with the HFI includes providing UUIDs to the HFI. In one embodiment, the memory controller indicates functionality and the HFI stores a UUID indication for each functionality exposed. The HFI can store the memory computation functionality locally, which can then be accessible to remote nodes through the fabric.

In one embodiment, the core of Node 1 generates a request message to the HFI, such as from execution of an application, 510. In one embodiment, the HFI extracts remote memory computation parameters from the message, 512. In one embodiment, the HFI identifies on the network whether the target node includes the memory computation capabilities necessary to execute the command. In one embodiment the HFI of Node 1 sends a discovery request to the HFI of Node 2, 514. In one embodiment, the HFI of Node 1 tunnels the discovery request. In one embodiment, the HFI of Node 1 specifically targets Node 2 with the request for specific memory addresses associated with the request (e.g., data is already stored at Node 2). In one embodiment, the HFI of Node 1 sends discovery to multiple nodes, such as to identify which node to store data for later computations.

The HFI of Node 2 can receive the discovery request and tunnel a reply to indicate functionality F( ) or other memory computation capability available from Node 2, 516. In one embodiment, the HFI of Node 2 indicates an acknowledgement of a specific memory computation functionality request. In one embodiment, the HFI of Node 2 replies to indicate multiple (such as all) memory computation functionalities are available at Node 2. The HFI of Node 1 can reply to the core of Node 1 to enable execution at the core to determine whether to send a memory computation command to Node 2.

It will be understood that the HFI of Node 1 (and the HFI of Node 2 when it acts in a role of discovery) can map the node functionality of the system in which they are incorporated. For example, the HFI can include address decoders or other mechanisms or a combination to perform such mapping. In one embodiment, the HFI will expose such mapping information to one or more applications executed by the core.

Figure 6:
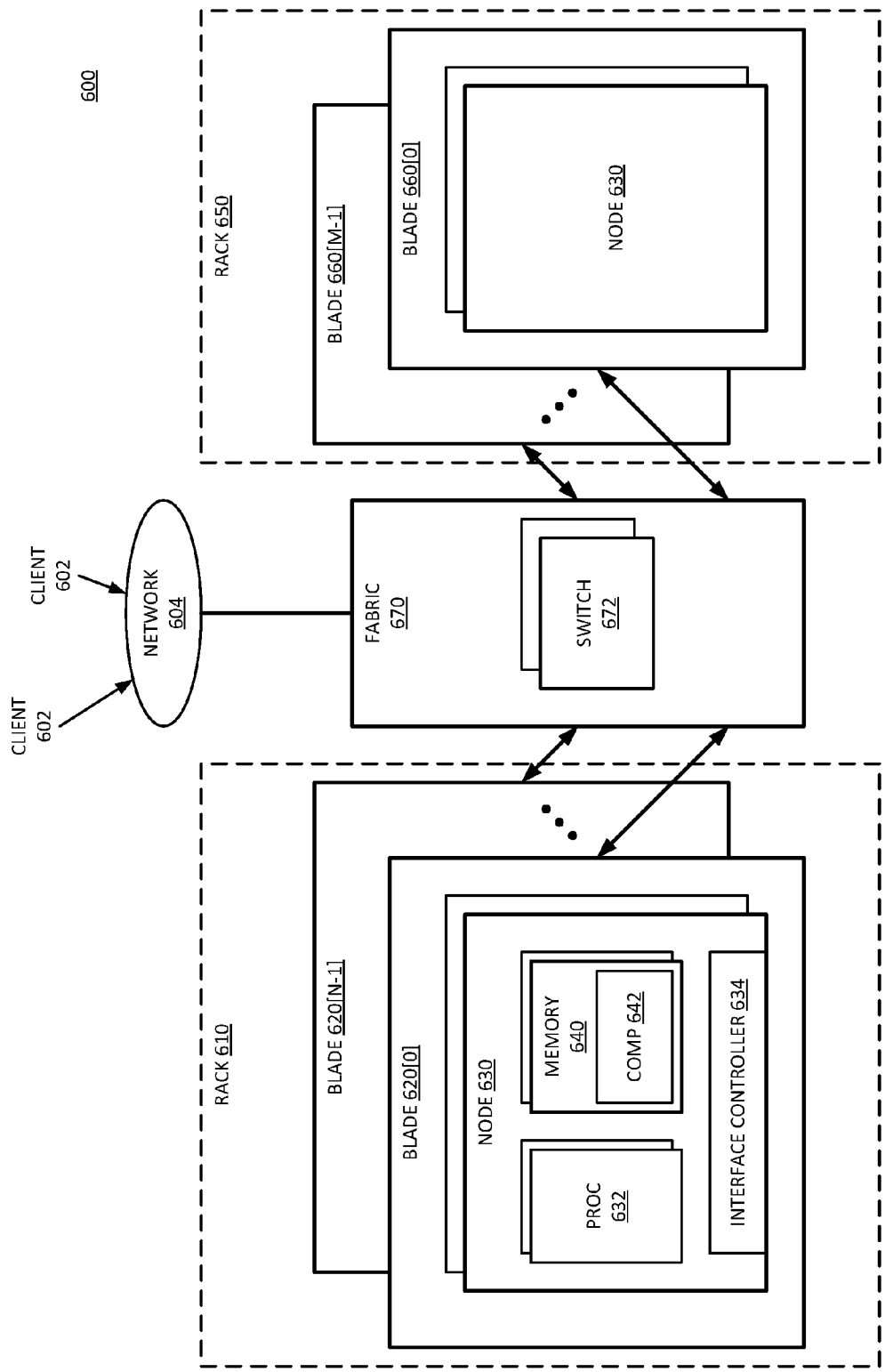
FIG. 6 is a block diagram of an embodiment of a multi-node network in which remote memory computation can be implemented.

FIG. 6 is a block diagram of an embodiment of a multi-node network in which remote memory computation can be implemented. System 600 represents a network of nodes in accordance with any embodiment described herein. In one embodiment, system 600 represents a data center. In one embodiment, system 600 represents a server farm. In one embodiment, system 600 represents a data cloud or a processing cloud.

One or more clients 602 make requests over network 604 to system 600. Network 604 represents one or more local networks, or wide area networks, or a combination. Clients 602 can be human or machine clients, which generate requests for the execution of operations by system 600. System 600 executes applications or data computation tasks requested by clients 602.

In one embodiment, system 600 includes one or more racks, which represent structural and interconnect resources to house and interconnect multiple computation nodes. In one embodiment, rack 610 includes multiple nodes 630. In one embodiment, rack 610 hosts multiple blade components 620. Hosting refers to providing power, structural or mechanical support, and interconnection. Blades 620 can refer to computing resources on printed circuit boards (PCBs), where a PCB houses the hardware components for one or more nodes 630. In one embodiment, blades 620 do not include a chassis or housing or other "box" other than that provided by rack 610. In one embodiment, blades 620 include housing with exposed connector to connect into rack 610. In one embodiment, system 600 does not include rack 610, and each blade 620 includes a chassis or housing that can stack or otherwise reside in close proximity to other blades and allow interconnection of nodes 630.

System 600 includes fabric 670, which represents one or more interconnectors for nodes 630. In one embodiment, fabric 670 includes multiple switches 672 or routers or other hardware to route signals among nodes 630. Additionally, fabric 670 can couple system 600 to network 604 for access by clients 602. In addition to routing equipment, fabric 670 can be considered to include the cables or ports or other hardware equipment to couples nodes 630 together. In one embodiment, fabric 670 has one or more associated protocols to manage the routing of signals through system 600. In one embodiment, the protocol or protocols is at least partly dependent on the hardware equipment used in system 600.

As illustrated, rack 610 includes N blades 620. In one embodiment, in addition to rack 610, system 600 includes rack 650. As illustrated, rack 650 includes M blades 660. M is not necessarily the same as N; thus, it will be understood that various different hardware equipment components could be used, and coupled together into system 600 over fabric 670. Blades 660 can be the same or similar to blades 620. Nodes 630 can be any type of node as described herein, and are not necessarily all the same type of node. System 600 is not limited to being homogenous, nor is it limited to not being homogenous.

For simplicity, only the node in blade 620[0] is illustrated in detail. However, other nodes in system 600 can be the same or similar. At least some nodes 630 are computation nodes, with processor 632 and memory 640. A computation node refers to a node with processing resources (e.g., one or more processors) that executes an operating system and can receive and process one or more tasks. In one embodiment, at least some nodes 630 are storage server nodes with a server as processing resources 632 and memory 640. A storage server refers to a node with more storage resources than a computation node, and rather than having processors for the execution of tasks, a storage server includes processing resources to manage access to the storage nodes within the storage server.

In one embodiment, node 630 includes interface controller 634, which represents logic to control access by node 630 to fabric 670. The logic can include hardware resources to interconnect to the physical interconnection hardware. The logic can include software or firmware logic to manage the interconnection. In one embodiment, interface controller 634 is or includes a host fabric interface, which can be a fabric interface in accordance with any embodiment described herein.

Node 630 includes memory subsystem 640. In accordance with embodiments described herein, memory 640 includes memory computation resources (comp) 642, which represent one or more capabilities by memory 640 to perform memory computations. As described herein, system 600 enables remote memory operations. Thus, nodes 630 can request memory computations by remote nodes, where data for the computation remains local to the executing node instead of being sent over fabric 670 or instead of being sent from the memory to the fabric interface. In response to execution of the memory computation, the executing node can provide a result to the requesting node.

Processor 632 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 640 can be or include memory devices and a memory controller.

Reference to memory devices can apply to different memory types. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), or others or combinations of memory technologies, and technologies based on derivatives or extensions of such specifications.

In addition to, or alternatively to, volatile memory, in one embodiment, reference to memory devices can refer to a nonvolatile memory device whose state is determinate even if power is interrupted to the device. In one embodiment, the nonvolatile memory device is a block addressable memory device, such as NAND or NOR technologies. Thus, a memory device can also include a future generation nonvolatile devices, such as a three dimensional crosspoint (3DXP) memory device, other byte addressable nonvolatile memory devices, or memory devices that use chalcogenide phase change material (e.g., chalcogenide glass). In one embodiment, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Figure 7:
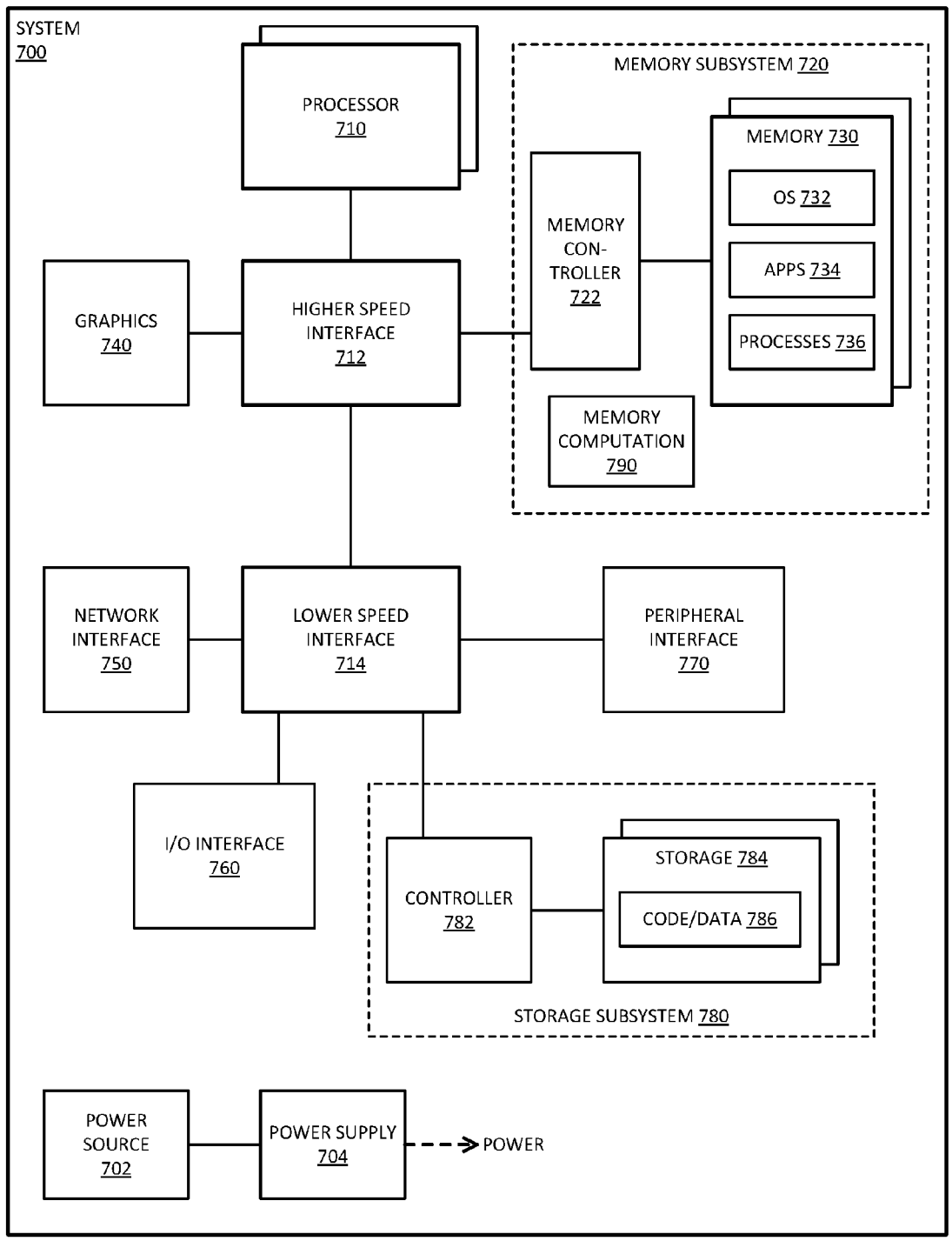
FIG. 7 is a block diagram of an embodiment of a computing system for a multi-node network in which remote memory computation can be implemented.

FIG. 7 is a block diagram of an embodiment of a computing system for a multi-node network in which remote memory computation can be implemented. System 700 represents a computing device in accordance with any embodiment described herein, and can be a node in a network of nodes. System 700 can thus represent a blade server, or a computation node of a blade (in an implementation where a blade includes multiple nodes), or a storage server, or other computational node. System 700 includes memory resources as described in more detail below.

System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one embodiment, system 700 includes interface 712 coupled to processor 710, which can represent a higher speed interface or a high throughput interface for system components that needs higher bandwidth connections, such as memory subsystem 720 or graphics interface components 740. Interface 712 can represent a "north bridge" circuit, which can be a standalone component or integrated onto a processor die. Graphics interface 740 interfaces to graphics components for providing a visual display to a user of system 700. In one embodiment, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more memory devices 730 such as read-only memory (ROM), flash memory, one or more varieties of random access memory (RAM), or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide logic to provide functions for system 700. In one embodiment, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

In one embodiment, system 700 includes interface 714, which can be coupled to interface 712. Interface 714 can be a lower speed interface than interface 712. In one embodiment, interface 714 can be a "south bridge" circuit, which can include standalone components and integrated circuitry. In one embodiment, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, USB (universal serial bus), or other wired or wireless standards-based or proprietary interfaces. Network interface 750 can exchange data with a remote device, which can include sending data stored in memory or receiving data to be stored in memory.

In one embodiment, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one embodiment, system 700 includes storage subsystem 780 to store data in a nonvolatile manner. In one embodiment, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one embodiment, storage subsystem 780 includes controller 782 to interface with storage 784. In one embodiment controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 702 to provide power to the components of system 700. In one embodiment, power supply 704 includes an AC to DC (alternating current to direct current) adapter to plug into a wall outlet. Such AC power can be renewable energy (e.g., solar power) power source 702. In one embodiment, power source 702 includes a DC power source, such as an external AC to DC converter. In one embodiment, power source 702 or power supply 704 includes wireless charging hardware to charge via proximity to a charging field. In one embodiment, power source 702 can include an internal battery or fuel cell source.

System 700 illustrates memory computation 790 in memory subsystem 720, which represents one or more memory computation capabilities of system 700. In one embodiment, system 700 includes an interconnection to a fabric interface, and can expose memory computation 790 to the fabric interface in accordance with any embodiment described herein. The fabric interface exposes the memory computation to other nodes in a network, and can discover remote memory computation capabilities. System 700 can receive a remote memory computation request to execute one or more operations in memory computation 790, which computation will not require sending data to the HFI, or across the fabric to the remote requestor, in accordance with any embodiment described herein.

In one aspect, a node in a network of nodes includes: a fabric interface to couple to the network of nodes; a processor to execute operations at the node; and a memory subsystem with a memory computation resource separate from the processor; wherein the memory subsystem to receive a request from a remote node processor for a memory computation, and in response to the request, to perform the computation locally at the memory subsystem and send the result of the computation to the remote node.

In one embodiment, the node comprises a node of a server in a data center. In one embodiment, the fabric interface comprises a host fabric interface (HFI) to couple to a host switching fabric. In one embodiment, the fabric interface is to receive the request tunneled through a fabric protocol, and to tunnel the result to the remote node through the fabric protocol. In one embodiment, the memory subsystem further comprises a memory controller, the memory controller to register a capability of the memory computation resource with the fabric interface. In one embodiment, the fabric interface is to expose the capability of the memory computation resource to other nodes in the network. In one embodiment, the fabric interface is to expose a universal unique identifier (UUID) corresponding to a capability of the memory computation resource. In one embodiment, the result comprises data resulting from the computation. In one embodiment, the result comprises an acknowledgement message of performance of the computation without result data. In one embodiment, the memory subsystem is to store result data locally at the memory subsystem.

In one aspect, a network of nodes in a processing system: an interconnection fabric; and multiple nodes coupled via the interconnection fabric, wherein a node including a fabric interface to couple to the interconnection fabric; a processor to execute operations at the node; and a memory subsystem with a memory computation resource separate from the processor; wherein a first node is to provide a request for a memory computation to a second node to cause the memory subsystem at the second node to perform the computation locally at the memory subsystem of the second node and send the result of the computation to the first node.

In one embodiment, the first node comprises a processing node, and the second node comprises a processing node. In one embodiment, the first node comprises a processing node, and the second node comprises a storage server. In one embodiment, the first node is to tunnel the request through the fabric to the second node, and the second node is to tunnel the result through the fabric to the first node. In one embodiment, the memory subsystem further comprises a memory controller, the memory controller to register a capability of the memory computation resource with the fabric interface. In one embodiment, the fabric interface is to expose the capability of the memory computation resource to other nodes in the network. In one embodiment, the fabric interface is to expose a universal unique identifier (UUID) corresponding to a capability of the memory computation resource. In one embodiment, further comprising the first node to send a discovery request to the second node to discover the memory computation resource of the second node. In one embodiment, the second node is to store result data locally at the memory subsystem of the second node.

In one aspect, a method of operation in a network of nodes includes: receiving at a target node a request for a memory computation from a remote node over an interconnection fabric; responsive to receiving the request, performing the memory computation locally at a memory subsystem of the target node; and sending a result of the computation to the remote node.

In one embodiment, the target node and the remote node comprise nodes of a server in a data center. In one embodiment, receiving the request comprises receiving the request at a host fabric interface (HFI) of the target node coupled to the interconnection fabric. In one embodiment, receiving the request comprises receiving a message tunneled through the interconnection fabric. In one embodiment, further comprising: registering the memory computation with a fabric interface, the fabric interface to expose the memory computation to the remote node. In one embodiment, the fabric interface is to expose a universal unique identifier (UUID) corresponding to a capability of the memory computation resource. In one embodiment, further comprising: receiving a discovery request from the remote node to discover memory computation capabilities of the target node; and responsive to receiving the discovery request, exposing one or more memory computation capabilities of the target node. In one embodiment, sending the result of the computation comprises sending data resulting from the computation. In one embodiment, sending the result of the computation comprises sending an acknowledgement message of performance of the computation without sending data resulting from the computation. In one embodiment, further comprising locally storing data resulting from the computation.

In one aspect, an apparatus comprising means for performing operations to execute a method in accordance with any embodiment of the above method of operation in a network of nodes. In one aspect, an article of manufacture comprising a computer readable storage medium having content stored thereon, which when executed causes a machine to perform operations to execute a method in accordance with any embodiment of the above method of operation in a network of nodes.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware, software, or a combination. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, data, or a combination. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals, or both, to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A node in a network of nodes, comprising:
a fabric interface to couple to the network of nodes;
a local processor to execute operations at the node; and
a memory subsystem at the node with a memory computation resource separate from the local processor, the memory subsystem to receive a request from a remote processor of a remote peer node for access to data stored in the memory subsystem, the access for performance of a computation on the data to generate a result, the result to be different data based on performance of the computation on the data, and in response to the request, to perform the computation on the data locally at the memory subsystem with the memory computation resource without sending of the data to either the local processor or to the remote processor, and send the result to the remote peer node.

2. The node of claim 1, wherein the node comprises a node of a server in a data center.

3. The node of claim 1, wherein the fabric interface comprises a host fabric interface (HFI) to couple to a host switching fabric.

4. The node of claim 1, wherein the fabric interface is to receive the request tunneled through a fabric protocol, and to tunnel the result to the remote peer node through the fabric protocol.

5. The node of claim 1, wherein the memory subsystem further comprises a memory controller, the memory controller to register a capability of the memory computation resource with the fabric interface.

6. The node of claim 5, wherein the fabric interface is to expose the capability of the memory computation resource to peer nodes in the network.

7. The node of claim 1, wherein the fabric interface is to expose a universal unique identifier (UUID) corresponding to a capability of the memory computation resource.

8. The node of claim 1, wherein the result comprises data generated as a result of the computation.

9. The node of claim 1, wherein the result comprises an acknowledgement message of performance of the computation without result data.

10. The node of claim 8, wherein the memory subsystem is to store locally at the memory subsystem the data generated as a result of the computation.

11. A network, comprising:
an interconnection fabric; and
multiple nodes coupled via the interconnection fabric, wherein a node including
a fabric interface to couple to the interconnection fabric;
a local processor to execute operations at the node; and
a memory subsystem at the node with a memory computation resource separate from the processor, a first node is to provide a request to a second node for access to data stored in the memory subsystem at the second node, wherein the first node and the second node are peer nodes, the access for performance of a computation on the data for the first node to generate a result, the result to be different data based on performance of the computation on the data, the request to cause the memory subsystem at the second node to perform the computation on the data locally at the memory subsystem of the second node with the memory computation resource without sending of the data to either the local processor or to a processor of the first node, and send the result to the first node.

12. The network of claim 11, wherein the first node comprises a processing node, and the second node comprises a processing node.

13. The network of claim 11, wherein the first node comprises a processing node, and the second node comprises a storage server.

14. The network of claim 11, wherein the first node is to tunnel the request through the fabric to the second node, and the second node is to tunnel the result through the fabric to the first node.

15. The network of claim 11, wherein the memory subsystem further comprises a memory controller, the memory controller to register a capability of the memory computation resource with the fabric interface.

16. The network of claim 15, wherein the fabric interface is to expose the capability of the memory computation resource to peer nodes in the network.

17. The network of claim 11, wherein the fabric interface is to expose a universal unique identifier (UUID) corresponding to a capability of the memory computation resource.

18. The network of claim 11, further comprising the first node to send a discovery request to the second node to discover the memory computation resource of the second node.

19. The network of claim 11, wherein the second node is to store result data locally at the memory subsystem of the second node.

20. A method of operation in a network of nodes, comprising:

receiving at a target node a request from a remote peer node over an interconnection fabric for access to data stored in a memory subsystem at the target node, the access for performance of a computation on the data for the remote peer node to generate a result, the result to be different data based on performance of the computation on the data;

responsive to receiving the request, performing the computation on the data locally at the memory subsystem of the target node with a memory computation resource of the target node separate from a local processor of the target node without sending the data to either the local processor or to a processor of the remote peer node; and sending the result to the remote peer node.

21. The method of claim 20, wherein receiving the request comprises receiving a message tunneled through the interconnection fabric.

22. The method of claim 20, further comprising:

registering the memory computation resources of the memory subsystem with a fabric interface, the fabric interface to expose the memory computation resources of the memory subsystem to the remote peer node.

23. The method of claim 20, further comprising:

receiving a discovery request from the remote peer node to discover memory computation capabilities of the target node; and responsive to receiving the discovery request, exposing one or more memory computation capabilities of the target node.

* * * * *